Figure 1:
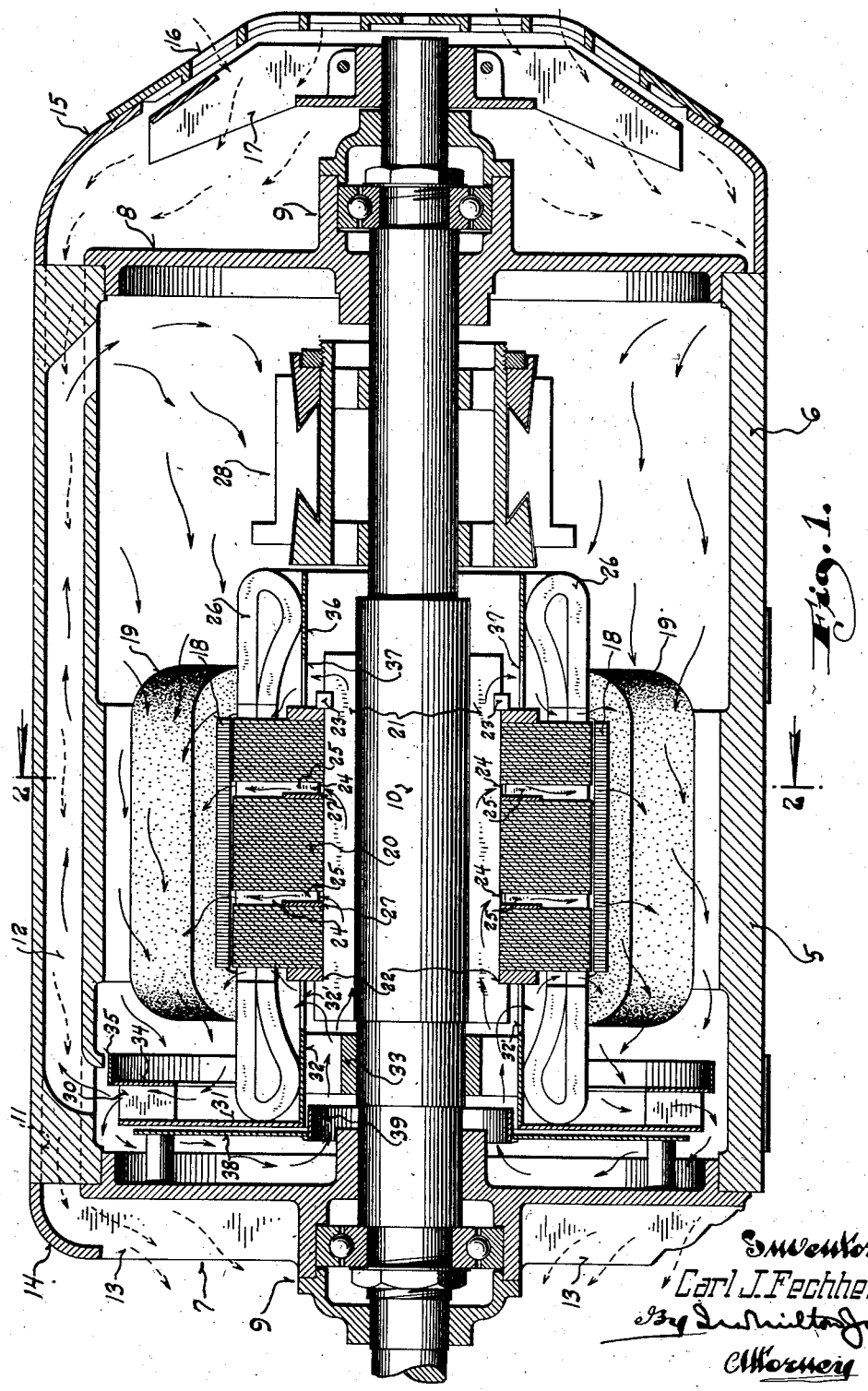

Jan. 2, 1940.  C. J. FECHHEIMER  2,185,728
DYNAMO-ELECTRIC MACHINE
Filed Nov. 1, 1937  2 Sheets-Sheet 1

Inventor
Carl J. Fechheimer
By Hamilton Jones
Attorney

Jan. 2, 1940.   C. J. FECHHEIMER   2,185,728
DYNAMO-ELECTRIC MACHINE
Filed Nov. 1, 1937   2 Sheets-Sheet 2

Inventor
Carl J. Fechheimer
By Hamilton Jones
Attorney

Patented Jan. 2, 1940

2,185,728

UNITED STATES PATENT OFFICE 2,185,728

DYNAMO-ELECTRIC MACHINE

Carl J. Fechheimer, Milwaukee, Wis., assignor to The Louis Allis Company, Milwaukee, Wis., a corporation of Wisconsin Application November 1, 1937, Serial No. 172,138

6 Claims. (Cl. 171—252)

This invention relates to dynamo-electric machines and refers particularly to so-called fan cooled direct current motors.

In dynamo-electric machines of this type, especially in the larger sizes, difficulty has been experienced in properly ventilating the armature. Heretofore, the construction of these machines has been such that the pressure generated by the centrifugal force of the rotating armature was opposed to the pressure produced by the fan and as a consequence, the air in juxtaposition to the rotor was more or less stagnant, making it difficult to carry off the heat generated thereat. As a result of this condition the armature temperature rise was either too great or the machine was larger than it should have been for a particular rating.

This invention therefore has as one of its primary objects to improve the construction of dynamo-electric machines of this type so that the armature will be properly ventilated by an adequate passage of cooling air therethrough.

Another object of this invention is to provide a dynamo-electric machine having a rotor core provided with air vents through which air flows at relatively high velocity to carry off the heat generated thereat.

Another object of this invention is to provide a simple manner of forming these air vents and of conducting air thereto.

Another object of this invention is to provide baffle means so situated with respect to the rotor core and the fan that the air issuing from the fan is divided into two circuits or paths, one of which extends longitudinally along the frame to the opposite end of the machine, and the other of which extends inwardly over one end wall to the central air passage of the rotor.

Still another object of this invention is to provide a manner of ventilating the interior of a totally enclosed dynamo-electric machine whereby two definite air circuits are established so related that the centrifugal force of the rotor has a cumulative effect on the fan which initially produces the desired air motion.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

Figure 2:
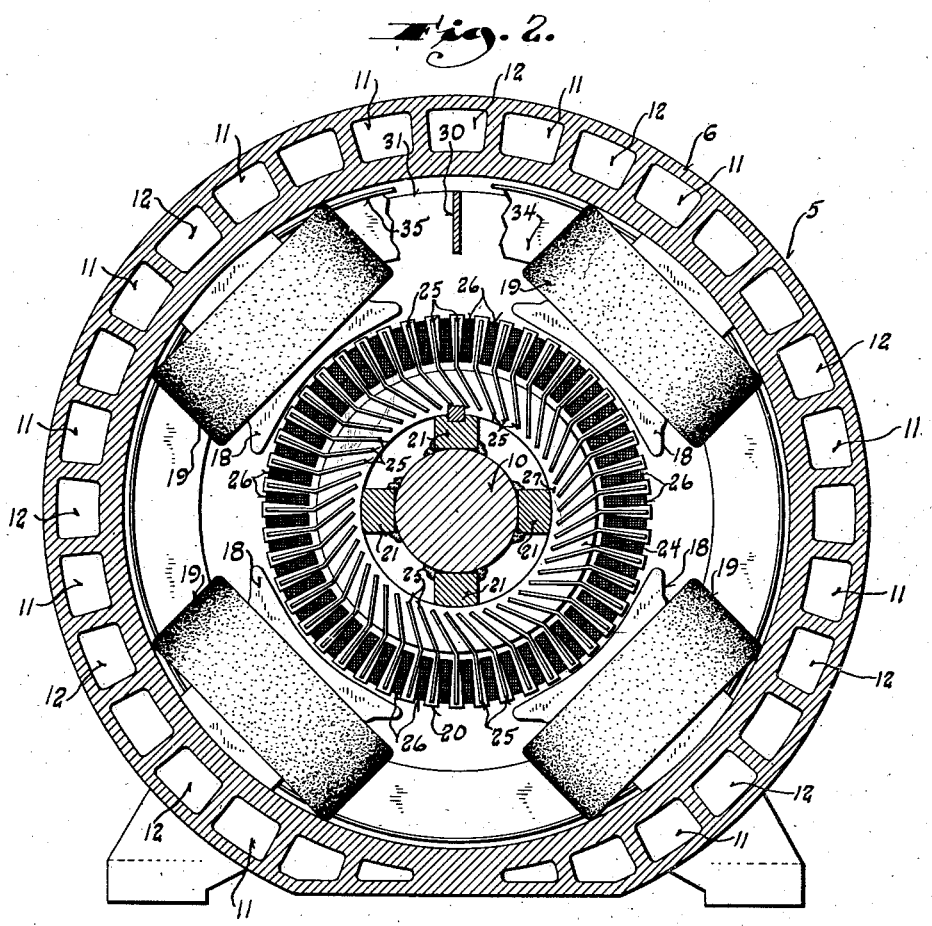

The accompanying drawings illustrate one complete example of the physical embodiment of the invention constructed in accordance with the best mode so far devised for the practical application of the principles thereof, and in which:

Figure 1 is a longitudinal sectional view through a direct current electric motor embodying this invention; and Figure 2 is a cross sectional view taken through Figure 1 on the plane of the line 2—2.

Referring now particularly to the accompanying drawings in which like numerals indicate like parts, the numeral 5 designates the housing of the motor, which in the present embodiment consists of a cylindrical part 6, generally referred to as the frame, and end walls 7 and 8 joined thereto with an explosion-proof connection. The end walls 7 and 8 carry bearings 9 in which the shaft 10 of the rotor is journalled. Like the connections between the end walls and the frame the joint between the end walls and the shaft is long enough to guard against the possibility of ignited gases passing out from the interior of the housing.

The frame 6 has alternate longitudinal external and internal air passages or channels 11 and 12, respectively. The external air passages are open at both ends to the atmosphere and the internal passages 12 open to the interior of the housing or casing at both ends.

Radial ribs 13 on the outer surface of the end wall 7 increase heat conduction to the outside atmosphere and to further facilitate the dissipation of heat from the end wall 7, a peripheral hood 14 guides and directs air issuing from the adjacent ends of the external air passages 11 inwardly over the ribbed face of the end wall.

Engaging the opposite end of the frame and spaced from the adjacent end wall 8 is a cover plate 15 having a central grilled inlet opening 16. Air admitted through the opening 16 passes directly to a fan 17 fixed to the adjacent end of the rotor shaft, which fan throws the air out into the longitudinal air passages 11.

Carried by the inner wall of the frame 6 nearer the end wall 7 than the wall 8 are stator poles 18 provided with the usual coils 19 and running within these poles is a laminated rotor core 20. The rotor core 20 is mounted from the shaft 10 by means of longitudinal equi-spaced bars 21 which are carried by the shaft. The core is fixed to these bars and is assembled between shoulders 22 at one end thereof and keys 23 secured in the opposite ends thereof.

The core is divided into endwise spaced sections with the spaces therebetween providing transverse or radial air passages or vents 24 leading from the space within the laminated core proper, to the outer periphery of the core. Disposed within these transverse or radial spaces are blades 25 which serve to hold the core sections properly spaced and also form fans to throw air outwardly from the central passage to the outer periphery of the core.

As shown in Figure 2, the blades 25 have their outer portions which lie between the coils 26 of the rotor radial and their inner portions directed to one side so as to be tangential to a circle slightly larger than the diameter of the adjacent portion of the shaft. These inner portions of the blades are fixed to flat rings 27 to hold the same assembled in one unitary structure.

Between the rotor core and the end wall 8 the shaft carries a commutator 28 with which brushes (not shown) cooperate.

Between the rotor core and the end wall 7 is a fan 30. The fan is mounted on the inner face of a flat circular baffle plate 31 extending outwardly from a cylindrical baffle 32 fixed to a supporting spider 33 which in turn is mounted directly on the shaft. The cylindrical baffle 32 lies just inside the rotor coils and has openings 32' in line with the coils, and the flat baffle 31 is located directly adjacent to the ends of the rotor coils. Fastened to the fan blades is a baffle ring 34 which carries a cylindrical flange 35 arranged in close juxtaposition to one edge of the adjacent inlet openings of the longitudinal air passages 12.

The opposite end of the rotor also has a cylindrical baffle 36 mounted inside the rotor coils 26 with the outer end thereof lying close to the commutator and its inner portion provided with air openings 37 to allow air flowing out along the rotor shaft to pass radially out through and around the adjacent ends of the coils 26.

Fixed to the end wall 7 is a stationary flat baffle plate 38 provided with a baffle ring 39 at its inner periphery. The baffle plate 38 is spaced from the inner face of the end wall 7 and cooperates therewith to provide an air passage for leading part of the air which issues from the fan 30 inwardly across the inner face of the wall 7 to the center of the rotor.

In operation the air issuing from the fan 30 is divided into two streams. The main stream which takes approximately sixty-five per cent of the air, flows through the longitudinal channels 12 where it is cooled by the flow of external air in adjacent passages 11. The other stream which takes the remaining part of the air issuing from the fan 30, flows radially inward between the baffle plate 38 and the end wall 7, to the rotor shaft, being cooled in its passage by contact with the end wall.

The centrifugal action of the rotor throws this air outwardly through the rotor core to join the main stream which has been cooled by its passage through the longitudinal ducts 12 and has swept across the commutator and around the stator poles.

With this distribution of the ventilating air, the pressure generated by the fan 30 is added to the pressure produced by centrifugal force in the armature vents. Consequently, the two impelling forces are cumulative so that the air flowing through the vents in the armature core has a high velocity and rapidly carries off the heat generated at the rotor or armature.

From the foregoing description taken in connection with the accompanying drawings, it will be readily apparent to those skilled in the art, that this invention provides a substantial improvement in the means for cooling and ventilating fan cooled totally enclosed dynamo electric machines, and it is to be understood that while the embodiment of the invention illustrated is a direct current motor having a commutator the invention is also equally applicable to alternating current commutator motors and to the slip ring rotor type of induction motor, for in such instances the slip rings merely occupy the location of the commutator in a D. C. machine.

What I claim as my invention is:

1. In a dynamo-electric machine: a frame having alternate internal and external longitudinal air passages opening respectively at their ends to the inside of the frame and to the outside atmosphere; end walls closing the end of the frame to form a closed casing; bearings carried by the end walls; a rotor journalled in said bearings, said rotor having a laminated core provided with radial vents, and a central longitudinal air passage leading to the radial vents from the ends of the core; a fan within the casing arranged to throw air into the internal longitudinal passages of the frame; and baffle means arranged in juxtaposition to the fan for guiding part of the air issuing from the fan inwardly over one end wall to the central air passage in the rotor core and its radial vents.

2. In a dynamo-electric machine: a closed substantially cylindrical casing having alternately external and internal longitudinal air passages in its cylindrical wall opening respectively and at both ends to the outside atmosphere and to the interior of the casing; bearings carried by the end walls of the casing; a rotor journalled in said bearings and having a central longitudinal air passage through its core, and radial air passages leading therefrom; a fan carried by the rotor and positioned adjacent to one end wall and substantially in line with the adjacent open ends of the internal longitudinal air passages in the casing wall for driving air into said longitudinal passages, which air flows therethrough to return to the casing interior at the opposite end of the machine; and baffle means between the fan and said end wall for conducting part of the air issuing from the fan inwardly to the central longitudinal air passage and thence to the radial passages through the core.

3. In a dynamo-electric machine: a substantially cylindrical frame having spaced alternate external and internal longitudinal air passages through its outer wall opening respectively and at both ends to the outside atmosphere and to the interior of the casing; means for causing a flow of air through the external air passages; bearings carried by the end walls of the casing; a rotor journalled in said bearings and having a laminated core provided with a central longitudinal air passage and radial air passages leading outwardly through the core from said central passage; a commutator carried by the rotor near one end wall of the casing; a fan carried by the rotor near the opposite end wall of the casing and arranged to throw air outwardly into the adjacent open ends of the internal longitudinal air passages of the frame which air travels therethrough to return to the interior of the casing adjacent the commutator; and a baffle carried by the end wall adjacent to the fan to guide part of the air issuing from the fan inwardly to the central longitudinal air passage of the rotor so that such air can flow out through the radial passages of the rotor to join the air flowing over the commutator in its return to the fan.

4. In a dynamo-electric machine of the enclosed fan cooled direct current type: a frame having adjacent external and internal longitudinal air passages opening respectively and at both ends to the outside atmosphere and to the interior of the frame; end walls closing the ends of the frame; bearings carried by the end walls; a rotor having its shaft journalled in said bearings and having a laminated core and a commutator; stator poles carried by the frame in cooperative relation to the rotor core, said rotor core having a central air passage therethrough and having radial air passages leading from its central passage to the periphery of the rotor so that air entering the central air passage is thrown outwardly through said radial passages; a fan carried by the rotor adjacent one end wall and in line with the adjacent open ends of the internal longitudinal air passages through the casing wall to cause air to enter the same and travel therethrough toward the opposite end of the machine where it sweeps across the commutator and returns past the stator poles to the fan; baffle means to guide part of the air issuing from the fan inwardly across the adjacent end wall to the central longitudinal air passage for admission to the radial air passages of the rotor core; and means for driving air through the external longitudinal air passages of the frame.

5. In a dynamo-electric machine: a frame having alternate internal and external longitudinal air passages opening respectively at their ends to the inside of the frame and to the outside atmosphere; end walls closing the ends of the frame to form a closed casing; bearings carried by the end walls; a rotor journalled in said bearings, said rotor having a laminated core provided with radial vents, and a central longitudinal air passage leading to the radial vents from the ends of the core; a rotatable baffle within the casing adjacent to one end wall and in spaced relationship therewith to define a radial air passage and having another part angular thereto and extending toward the rotor core and spaced from the rotor shaft to define a longitudinal air passage from said radial passage to the central longitudinal air passage of the rotor core; impellers carried by the rotatable baffle and arranged to throw air outwardly into the adjacent open ends of the internal longitudinal air passages in the frame; said rotatable baffle being so disposed with respect to the internal longitudinal air passage openings as to guide part of the air issuing from the impellers inwardly through said radial passage to be conducted to the central air passage in the rotor core and its radial vents by the angular portion of the baffle.

6. In a dynamo-electric machine: a frame having alternate internal and external longitudinal air passages opening respectively at their ends to the inside of the frame and to the outside atmosphere; end walls closing the ends of the frame to form a closed casing; bearings carried by the end walls; a rotor journalled in said bearings, said rotor having a laminated core provided with radial vents, and a central longitudinal air passage leading to the radial vents from the ends of the core; stationary and rotatable baffles adjacent one end of the casing; said stationary baffle being carried by said end wall in spaced relationship therewith and extending radially outwardly to a point adjacent to the mouths of the internal longitudinal air passages, said baffles cooperating to form a radial air passage leading to the mouths of the internal longitudinal air passage, impellers carried by the rotatable baffle for circulating air through said internal longitudinal air passages of the frame and radially inwardly through the space between the stationary baffle and said end wall; and means on said rotatable baffle for directing air flowing through the space between the stationary baffle and said end wall to the central air passage in the rotor core and its radial vents.

CARL J. FECHHEIMER.